Nov. 27, 1934.  J. C. PATRICK  1,981,968
ELECTRICAL CONDUCTOR
Filed July 14, 1930
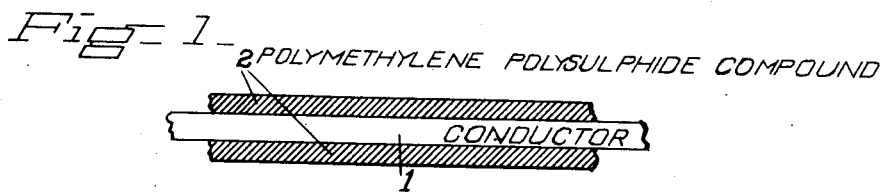
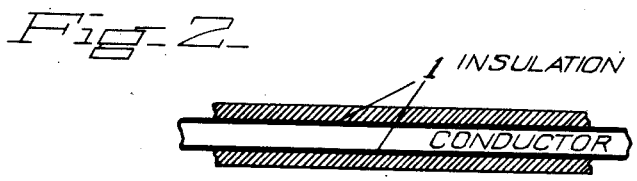
Joseph C. Patrick INVENTOR
BY
Gifford, Sewell & Burgess ATTORNEYS Patented Nov. 27, 1934

1,981,968

UNITED STATES PATENT OFFICE 1,981,968

ELECTRICAL CONDUCTOR

Joseph C. Patrick, Kansas City, Mo.

Application July 14, 1930, Serial No. 467,966

12 Claims. (Cl. 173—264)

The present invention relates to improvements in electrical conductors and more particularly in insulated electrical conductors which are exposed to unusual and to severe conditions involving chemical corrosion, contact with oil, exposure to high tension current and the like, such as are found in high tension insulated conductors, submarine and subterranean cables and the like.

In accordance with the present invention, such an improved conductor is prepared by providing upon an electrical conductor a sheathing of olefin polysulfide plastic, by which term I designate organic polysulfides derived by the reaction of polysulfides upon methylene bodies, such as methylene dihalides or formaldehyde, and other olefin bodies, particularly dihalides, such as the dihalides of ethylene, propylene, butylene and the like, whereby products of the empirical formula $C_nH_{2n}S_x$ are secured, containing from 3 to 5 times the amount of the polysulfide sulfur in the molecule as is contained in the corresponding simple sulfide. Compounds of this character are disclosed in my prior applications Serial Nos. 239,808, filed December 13, 1927 and continued as application 538,389, which resulted in Patent No. 1,890,191 issued December 6, 1932, and 393,830, filed September 19, 1929 which has resulted in Patent No. 1,950,744 of March 13, 1934. As disclosed in the latter application, the olefin polysulfide plastic may be prepared in the first form by carrying out the formative reaction between the active olefin body (under which term I include methylene bodies) and the soluble polysulfide in the presence of suitable dispersing agents, such as precipitated magnesium hydroxide.

In preparing the olefin polysulfide plastic as a sheathing for a conductor, I prefer to stabilize the properties of the olefin polysulfide plastic and prevent its subsequent hardening by a heat treatment, for example, as described in the application of Nathan M. Mnookin, Serial No. 361,012 which has matured into Patent No. 1,854,480, issued April 19, 1932. In such heat treatment, the plastic is heated to a moderate temperature, say between 200 and 300° F. for a sufficient period to secure the desired stabilization of its mechanical properties, longer periods being required at lower temperatures. For example, a temperature of 287° F. for a period of 40 to 60 minutes has been found satisfactory.

For increased facility in handling the plastic material, particularly when molding devices such as extrusion presses are employed in applying or forming the sheathing upon the electrical conductor, the olefin polysulfide plastic may be modified by the incorporation of certain compounding agents to soften the compound, impart plasticity and "tack" thereto, and to modify its insulating properties. Thus, small proportions of crude rubber, varying from 3 to 10 lbs. per 100 lbs. of olefin polysulfide plastic may be incorporated to impart additional plasticity and coherence or tack during fabrication, sulfur carriers such as zinc oxide or litharge may be incorporated, as may softening agents such as the fatty acids and fatty acid soaps and fillers such as magnesium oxide, magnesium carbonate, whiting, carbon black or the like. Other compounding ingredients may be incorporated in small proportions, such as waxes, organic nitrogenous bodies employed as accelerators in the rubber art, such as diphenylguanidine, hexamethylenetetramine, and organic reducing agents capable of acting as anti-oxidants in the rubber industry may be incorporated and are particularly desirable when small proportions of rubber are included in the compound. Instead of rubber I may employ as a softening agent small proportions of phenol-sulfur compound, prepared, for example, as described in the United States patent to Poirrier No. 646,873, granted April 3, 1900, by reaction between phenol and sulfur chloride; for example, from 1 to 5 parts thereof may be used to 100 parts of olefin polysulfide.

It is to be understood that the presence of the above-named compounding ingredients in the compound, or any particular one of them is not essential to securing the desirable properties in the sheath conductor to which this invention is directed, since a suitable sheath conductor may be prepared by embedding the conducting wire in a mass of the olefin polysulfide plastic material, which may be stabilized before or after the conductor is so embedded, and the plastic material then shaped to the desired external form by molding, cutting or other suitable means. The various compounding ingredients hereinbefore referred and equivalent material are preferably employed, however, to modify the plastic material, soften and impart plasticity and cohesion thereto, primarily for the purpose of enabling it to be handled in apparatus now commonly employed in shaping and molding plastic materials, such as rubber, in the arts. In any case, the proportions of the compounding materials employed are so controlled as not to affect deleteriously the desirable properties of the sheathed conductor, and particularly its resistance to attack by chemicals, solvents, and, in high tension conductors, corona.

In carrying out this invention, the sheathed conductor may be formed with the sheathing of olefin polysulfide plastic material directly upon or adjacent to the surface of the conductor, or upon or adjacent to a covering of other insulating material directly upon the conductor. In order that the invention may be fully understood, it is described hereinafter in connection with certain specific examples of the production of sheathed conductors, the details of which are, however, not intended to be regarded as limitations upon the scope of the invention, which may be carried into effect in numerous other ways.

In the accompanying drawing Fig. 1 indicates a longitudinal section through a section of a conductor with the sheathing applied in contact with the metal, and Fig. 2 is a similar view showing insulating material between the sheathing and the metal conductor. In the drawing reference character 1 indicates a longitudinal conductor with a sheath 2 of olefin polysulfide plastic material applied thereto and reference character 3 (Fig. 2) indicates any insulating electrical material now in common use between the conductor 1 and the olefin polysulfide plastic material 2.

Example I

In preparing the olefin polysulfide sheathing material, a suitable amount, say 50 lbs. of the olefin polysulfide plastic are milled upon an ordinary rubber mill until softened. Thereupon 3 lbs. of natural rubber, suitably in the form of smoked sheet, is milled in until thoroughly incorporated. The additional desired compounding ingredients are then thoroughly milled in, these being, for example, 4 lbs. of zinc oxide, 2 ounces of diphenylguanidine, 6 ounces of a suitable anti-oxidant, for example, a diphenylamine derivative such as that known as Neozone D, 8 ounces of carbon black, 4 ounces of stearic acid, 4 ounces of paraffin wax and 3 ounces of sulfur. Milling is continued until a thorough incorporation of the compounding ingredients is effected. The temperature of milling may vary, for example, temperatures from 140° to 180° F. have been found satisfactory. The resulting mixture is of a character which will tube readily in an ordinary extrusion tubing press and the tubing may suitably be accomplished with the temperature of the body of the tubing machine at about 120 to 140° F. and that of the head at about 150 to 180° F.

The compound is then extruded in the form a a tube of a suitable diameter to contain the electrical conductor, either bare or with a preliminary covering of insulating material. When employed as a sheathing for a bare conductor, the latter may be inserted into the tube of olefin plastic compound and the latter then heated to stabilization temperatures. When a preliminary covering of insulators such as oiled paper, oiled cambric or shellacked fabric is applied to the conductor, it is desirable to effect the stabilization of the sheathing of olefin polysulfide compounds prior to its application to the conductor. This may be accomplished in any suitable manner, as by placing the tube in a mold fitting it exteriorly and forcing through it steam under pressure sufficient to give the desired temperature, or preferably by extruding a lead sheath around the tube of olefin plastic compound and then effecting stabilization by forcing through the tube steam or hot water under sufficient pressure at a suitable stabilizing temperature, say about 287° F.

The stabilized tube is then cooled, the lead sheathing is stripped off and the conductor inserted. Preferably, before inserting the conductor, the tube is filled with oil and then drained in order to leave a lubricating film of oil on its interior wall. Where the conductor has a preliminary covering of oiled paper or fabric, the oil employed in lubricating the interior of the tube is preferably of the same character as that used in impregnating the paper or fabric covering. The conductor is then forced or drawn into the tube to form the finished sheathed conductor. If desired, insulating oil may be forced into the tube to fill interstices or unevenness between its interior surface and the exterior surface of the conductor or the primary insulating coating covering the latter, this being particularly desirable when the conductor is in the form of a cable made up of a plurality of wires. The ends of the cable may then be clamped, taped or otherwise closed up so as to retain the oil.

Other methods of forming a sheath conductor may be employed, and as indicated hereinbefore, the composition of the olefin polysulfide plastic may be varied as desired. The following example illustrates the formation of a sheath conductor in which the sheathing of olefin polysulfide compounds is applied directly to the surface of a metallic conductor, suitably by an extrusion operation.

Example II

A suitable compound for this purpose may be prepared by incorporating on a mill, as described in connection with Example No. I, with 22 lbs. of olefin polysulfide plastic, 1 lb. of natural rubber, 11 lbs. of whiting, 1.5 lbs. of zinc oxide, 6 ounces of litharge, and 8 ounces of paraffin wax. This compound, prepared and worked as described in connection with Example No. I, is then extruded through a heated extrusion press around the conductor wire or cable as a core, forming a sheathing thereupon and is stabilized by steam or hot water heating under the conditions hereinbefore set forth. It will be noted that the use of carbon black is eliminated in the production of this compound, and whiting is employed as a filler, higher di-electric properties being thereby secured. Other non-conducting fillers may be employed, such as china clay, barium sulfate or the like.

In the preceding specific examples, the preparation of compositions which can be readily formed by extrusion in moderately heated extrusion presses has been described, since such devices are in common use in the industry. It is readily apparent that many other modifications of compounds may be employed, particularly where other methods of shaping or molding the sheating upon the conductors are employed. In all such compounds, however, the olefin polysulfide plastic, in accordance with this invention, constitutes the major plastic constituent of the compound. Thus rubber may be entirely omitted, or may be employed as hereinbefore described. Where high resistances to chemical reaction and to corona effect are desired, it is preferred that the proportion of rubber shall not exceed 5% of the proportion of olefin polysulfide plastic; but higher proportions of rubber may be employed when these properties are not required to so high a degree. Although various softening agents may be employed and are desirable when the extrusion process of molding is employed, when other methods of molding are used they may be reduced in proportion or eliminated entirely. The olefin polysulfide plastic may be formed from the reaction of soluble polysulfides with any suitable olefin or methylene body such as methylene dihalides, formaldehyde, or dihalides of ethylene, propylene, butylene or higher olefines. For compounds for extrusion purposes, I prefer to employ the ethylene polysulfide plastic derived by the reaction of ethylene dichloride with soluble polysulfides and containing from 3.8 to 5 times the proportion of sulfur which would be present in the corresponding simple sulfides. I may, however, employ compounds formed with a lower proportion of sulfur, preferably at least 2.5 to 3 times that present in the corresponding simple sulfides.

In molding operations with the polysulfide plastic, in the stabilizing operation, the compound is found to adhere strongly to various metals, such as iron, steel, copper and the like. Where it is to be stabilized in the presence of such metals, and particularly iron and steel, and adherence is not desired, it may be avoided by oiling the metal. By stabilizing in direct contact with such metals, strongly adherent composite articles may be obtained, as when sheathed conductors are prepared in accordance with this invention, with the olefin polysulfide compound directly in contact with the conductor metal. The olefin polysulfide compound is found not to adhere to ordinary aluminum surfaces, even though polished, unless special treatment of the aluminum surfaces is given.

Hitherto, in the preparation of sheath conductors which are intended to encounter particularly difficult conditions, such as contact with salt water, soil acids, corona effect due to high voltage currents and the like, it has been necessary to apply to the insulated conductor an outer sheathing of some special material such as metallic lead, thereby introducing many serious disadvantages, such as weight, condenser effect, conductivity of the sheathing and the like. By employing a conductor sheathed with olefin polysulfide plastic in accordance with the present invention, complete resistance to chemical action, including that of salt water, and soil acids and to corona effect are secured without the use of external metallic sheathing, and at the same time complete resistance to solvent action as of oils, is likewise secured. For example, when exposed to the usual corona test (exposure to an ozone-containing atmosphere under elevated temperature conditions), a rubber sheathed conductor showed complete break-down of the rubber within an hour. Under a similar test, no action whatsoever was apparent upon a conductor sheathed with olefin polysulfide plastic after over one thousand hours test. The olefin polysulfide plastic sheathing has a very high resistance, a sheathing five-sixteenth inches thick withstanding voltages up to and exceeding fifty thousand.

I claim:

1. As an article of manufacture, a conductor enclosed in a sheath of plastic material composed principally of an ethylene-polysulfide reaction product, the sulfur content of which is from 3 to 5 times that of a corresponding simple sulfide.

2. As an article of manufacture, a conductor enclosed in a sheath of plastic material composed principally of methylenehalide polysulfide reaction products.

3. As an article of manufacture, a conductor enclosed in a sheath of plastic material composed principally of propylene-polysulfide.

4. As an article of manufacture, a conductor enclosed in a sheath of plastic material, the principal plastic constituent thereof being an olefin polysulfide compound derived from a linear olefin of the general formula $C_nH_{2n}$, and an oil interposed between the conductor and the sheath.

5. As an article of manufacture, a conductor enclosed in a sheath of plastic material, the principal plastic constituent thereof being an olefin polysulfide compound derived from a linear olefin of the general formula $C_nH_{2n}$, and an insulating covering surrounding said conductor and interposed between the conductor and the sheath.

6. As an article of manufacture, a conductor enclosed in a sheath of plastic material, the principal plastic constituent thereof being an olefin polysulfide compound derived from a linear olefin of the general formula $C_nH_{2n}$, and an insulating covering surrounding said conductor within the sheath, and oil interposed between said insulating covering and the interior of said sheath.

7. As an article of manufacture, a conductor enclosed in a sheath of plastic material, said material having as one of its principal constituents a substantial amount of the reaction product of a linear polymethylene compound having methylene halide terminals with an alkaline polysulfide.

8. As an article of manufacture, a copper conductor enclosed in a sheath of plastic material, said material having as one of its principal constituents a substantial amount of the reaction product of a linear polymethylene compound having methylene halide terminals, said compounds having terminal negative radicals, and an alkaline polysulfide.

9. As an article of manufacture, a conductor enclosed in a sheath of plastic material, said material having as one of its principal constituents a product comprising the reaction products between the alkaline polysulfides and olefin compounds containing the group $C_nH_{2n}$ combined with the equivalent of two monovalent negative radicals.

10. As an article of manufacture, a conductor enclosed in a sheath of plastic material, said material having as one of its principal constituents a product comprising a composition that is the reaction products of alkaline polysulfide and additive compounds containing the group $C_nH_{2n}$ and the equivalent of two monovalent negative radicals.

11. As an article of manufacture, a conductor enclosed in a sheath of plastic material, said material having as one of its principal constituents a product comprising a composition composed mainly of combined sulfur, said composition being the reaction products of halogen compounds of olefins of the formula $C_nH_{2n}X_2$ where X is a halogen.

12. As an article of manufacture, a conductor enclosed in a sheath of plastic material, said plastic material comprising mainly chemically combined sulfur and being the reaction products of alkaline polysulfides and dihalides of olefins of the general formula $C_nH_{2n}$.

JOSEPH C. PATRICK.